(12) United States Patent
Myers et al.

(10) Patent No.: US 10,041,682 B1
(45) Date of Patent: Aug. 7, 2018

(54) HIGH EFFICIENCY SOLID FUEL BURNING STOVE WITH OPTIMIZED BURNING CONDITIONS AND LOW LEVEL OF EMISSION

(71) Applicant: UNIVERSITY OF MARYLAND, College Park, MD (US)

(72) Inventors: Taylor Myers, Rocky Ridge, MD (US); Ryan Fisher, Charlotte, NC (US); Stanislav I Stoliarov, Odenton, MD (US)

(73) Assignee: University of Maryland, College Park, MD (US)

( * ) Notice: Subject to any disclaimer, the term of this patent is extended or adjusted under 35 U.S.C. 154(b) by 809 days.

(21) Appl. No.: 14/541,614

(22) Filed: Nov. 14, 2014

Related U.S. Application Data

(60) Provisional application No. 61/905,025, filed on Nov. 15, 2013.

(51) Int. Cl.
| | |
|---|---|
| *F23N 1/00* | (2006.01) |
| *F24B 1/02* | (2006.01) |
| *F24B 5/02* | (2006.01) |
| *F24B 13/02* | (2006.01) |
| *F23L 15/02* | (2006.01) |
| *F23L 9/00* | (2006.01) |
| *F23J 15/02* | (2006.01) |

(52) U.S. Cl.
CPC ............... *F24B 1/028* (2013.01); *F23J 15/02* (2013.01); *F23J 15/022* (2013.01); *F23L 9/00* (2013.01); *F23L 15/02* (2013.01); *F24B 5/026* (2013.01); *F24B 13/02* (2013.01)

(58) Field of Classification Search
CPC . F24B 1/028; F24B 5/026; F24B 13/02; F23J 15/02; F23J 15/022; F23L 9/00; F23L 15/02
See application file for complete search history.

(56) References Cited

U.S. PATENT DOCUMENTS 7,870,854 B2 * 1/2011 Lau ..................... F24B 1/028
110/101 C

* cited by examiner

*Primary Examiner* — Alfred Basichas
(74) *Attorney, Agent, or Firm* — Rosenberg, Klein & Lee

(57) ABSTRACT

A solid fuel stove uses a dynamically controlled Combustion Fan and a Smart Controller system for automatic regulation of combustion conditions through the controlled forced air circulation based on sensors readings. The stove also uses emission reducing and efficiency boosting equipment such as a co-axial stack heat recovery sub-system and a self-cleaning particulate collector with enhanced particulates trapping capabilities.

17 Claims, 13 Drawing Sheets

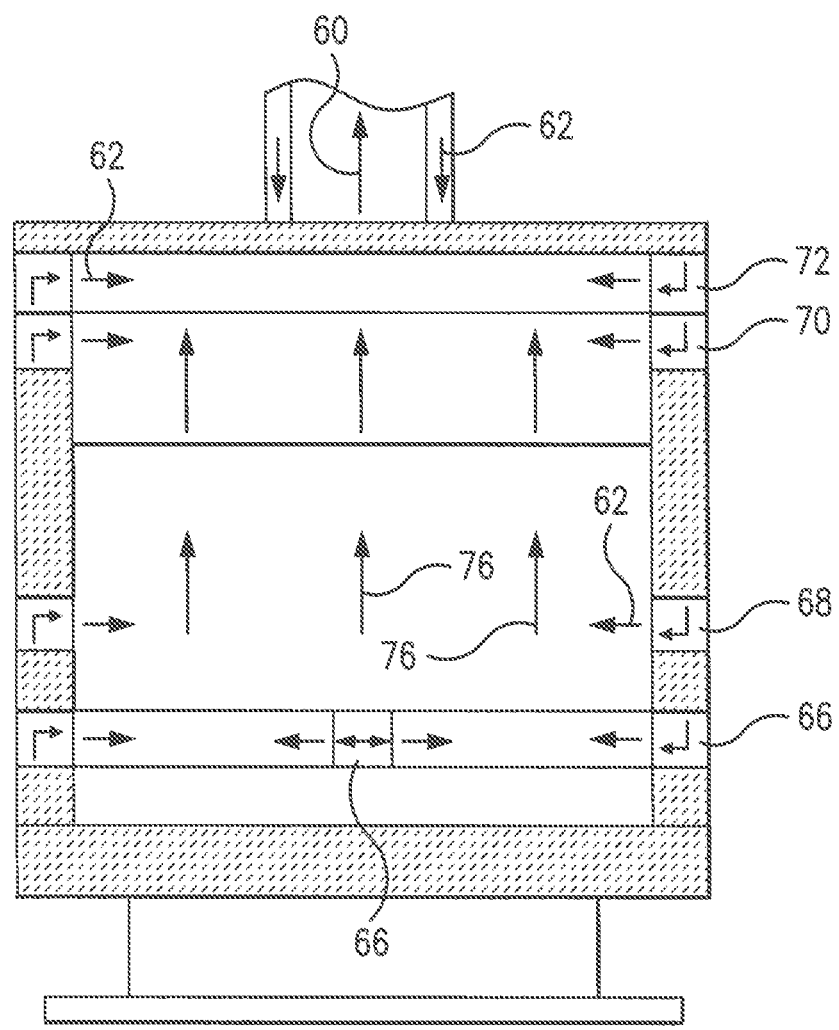

HIGH EFFICIENCY SOLID FUEL BURNING STOVE WITH OPTIMIZED BURNING CONDITIONS AND LOW LEVEL OF EMISSION

REFERENCE TO THE RELATED PATENT APPLICATIONS

This Utility Patent Application is based on the Provisional Patent Application No. 61/905,025 filed 15 Nov. 2013.

FIELD OF THE INVENTION

The present system relates to heat sources, and in particular to solid fuel burning stoves demonstrating high burning efficiency, extremely low levels of emission, which is particularly applicable for heating residential and office buildings.

More in particular, the present system is directed to solid fuel burning stoves in which improved performance characteristics and high burning efficiency are attained through forced air ventilation and dynamical control of a multi-phase burning process carried out in the stove facilitated by the use of a smart controller configured to support an optimal forced air distribution through the system.

The present system is further directed to a wood burning stove system promoting user friendliness, and producing a reduced level of particulates emission, which is attained by effective control of the fuel-forced air balance in the system, as well as the use of an enhanced self-cleaning particulates filter.

In addition, the present system is directed to a solid fuel burning stove provided with a forced air inlet for entering the air into the stove in a controlled manner, where the speed of the air entrance into the stove, as well as internal stove conditions, are dynamically monitored and adjusted to optimize the burning process.

The present system is also directed to a high efficiency solid fuel stove which may include thermoelectric generators (TEGs) embedded in the stove for generating electricity from the heat produced by the stove, so that the electricity generated by the TEGs may be used to power various components of the stove system, thus allowing the subject wood stove to operate in a substantially self-sufficient manner while minimizing reliance on external (i.e., public) utilities.

Furthermore, the present system is directed to a wood burning stove equipped with a system of air injection manifolds which facilitate an optimal distribution of air throughout the stove system by providing a turbulent well mixed environment in which an enhanced multi-phase fuel burning process can be achieved resulting in an effective fuel usage and almost undetectable emission levels.

The present invention is also directed to a high efficiency wood stove system equipped with a unique co-axial stack heat recovery sub-system which warms the incoming air and cools the exhaust, thus improving efficiency and reducing particulate emissions and heat waste.

BACKGROUND OF THE INVENTION

Wood burning stoves constitute an inexpensive source of heat, and have been used for centuries as a heat source for homes and other buildings, especially in household without access to natural gas.

However, conventional wood stoves suffer from a number of inadequacies that limit their performance. Specifically, conventional wood stoves rely exclusively on fire to drive a flow of combustion air, thus limiting the initial airflow and the ability to dynamically and actively regulate a fuel-air balance in the system, which results in a less than optimal burning environment. The reliance on fire to drive the exhaust also limits the efficiency of the conventional wood stoves since a sufficiently hot exhaust is required to maintain the airflow.

Due to less than optimal burning environment conditions in the conventional wood stoves, large amounts of particulate emissions are produced. This is a highly undesirable outcome of the conventional stoves operation leading to a lower air quality in areas surrounding wood stoves in use, thus possibly causing health problems.

Fire driven air flow in the conventional wood burning stoves may also create usability issues due to a low level of airflow available during a start-up stage of the wood stoves operation.

In addition, many modern wood stoves use a catalyst to lower the temperature necessary to combust carbon monoxide or other products of incomplete combustion. A problem faced by many of the contemporary stoves is that during the start-up mode of operation, the burning period which typically produces the most emissions, the catalyst must be by-passed entirely since the heat from the stove is not sufficient to drive the airflow through the thin tubes of the catalyst. The provisions which would allow such by-pass add to the cost associated with the development and fabrication of the stoves to meet these requirements, and necessitate higher emissions during the start-up.

It would be highly desirable to provide a high efficiency wood (or other solid fuel) burning stove with low emission levels and free of the shortcomings encountered in conventional wood stoves.

SUMMARY OF THE INVENTION

It is therefore an object of the present system to provide a solid fuel burning stove having a forced air inlet which is dynamically controlled to optimize the stove's fuel-air balance, as well as to adjust the forced air input speed to switch the operation of the stove in question between modes of operation required by the user (slow overnight burning or rapid home heating), as well as to minimize the stove's emission.

It is another object of the present system to provide a high efficiency solid fuel burning stove with controlled burning conditions, as well as an optimized and rapid distribution of the air in the system with reduced particulates emission.

It is still an object of the present system to provide a wood burning stove equipped with air injection manifolds for improved control of the forced airflow and support for the fuel-air balance in the system.

In addition, it is an object of the subject system to provide a solid fuel stove with an improved co-axial stack heat recovery sub-system having an internal pipe and an external pipe co-axial each with the other, where cold inlet air is forced down around the internal pipe carrying hot exhaust gases which are thus cooled while the cool inlet air is warmed, thereby even further improving the efficiency of the stove in question, and reducing the particulate emissions by raising temperature in the stove at an increased rate.

It is another object of the present system to provide a solid fuel burning stove equipped with a self-cleaning particulate trap sub-system designed for an enhanced accumulation of the particulates, thus contributing to reduced particulates emission.

It is a further object of the present system to provide a solid fuel burning stove where a catalyst (or catalyst combustor) is used for reducing the emission level, and wherein, due to the forced airflow within the stove, the airflow does not have to be diverted from the catalyst to avoid the passage of the airflow through the thin tubes of the catalyst at the initial stage of the burning process.

It is a further object of the present system to provide the solid fuel stove with a thermoelectric generator (TEG) embedded in the system to generate electricity from the heat of the stove and to use the generated electricity for powering up the stove's components such as, for example, the user interface, controllers, fans, as well as external electronic devices, thus promoting the wood stove operation in an "off-grid" manner without sacrificing the increase in performance permitted by the forced airflow.

The present system is directed to a high-efficiency low-emission oven system which comprises a main body configured with an internal compartment defined within the main body, and a combustion chamber defined in the internal compartment. The internal compartment further includes a preheat chamber defined therein which is in fluid communication with the combustion chamber.

A heat recovery member is attached to the main body and is configured to establish a fluid communication channel between the combustion chamber, as well as the preheat chamber, and the atmosphere surrounding the main body.

A combustion fan unit is installed in operative coupling to the heat recovery member to provide a forced air circulation through the internal compartment.

A system of sensors is installed in the internal compartment, and a controller system is operatively coupled to the system of sensors and the combustion fan unit. The controller system is configured with a processor unit for processing readings acquired from the sensors, and for generating control signals for transmission to the combustion fan unit to affect its operation in correspondence to the sensors' readings in order to dynamically control the burning process in the combustion chamber.

An air distribution system is installed in the combustion chamber in fluid communication with the preheat chamber. The air distribution system is configured for creating a predetermined distribution pattern of the air forcibly flowing in the combustion chamber from the preheat chamber which includes a plurality of air injecting manifolds disposed in the combustion chamber, as well as primary manifolds and secondary manifolds extending in a lower portion and in an upper portion of the combustion chamber, respectively.

A self-cleaning particulates filter is disposed in the combustion chamber to prevent unburned particulates from escaping into the surrounding atmosphere. The self-cleaning filter includes a particulates trap unit disposed in the combustion chamber in proximity to the secondary manifolds in the upper portion of the combustion chamber. The primary effluent reaching the particulates trap unit from the lower portion mixes with a secondary air flow injected into the upper portion of the combustion chamber through the secondary manifolds and undergoes a secondary combustion, thereby burning the unburned particles residing in the primary effluent.

The particulates trap unit includes a pair of plates disposed in spaced relationship each to the other. An array of fins are disposed on each of the plates in an angled relationship thereto and intermittently positioned in facing relationship each to the other, thereby creating an extended flow pass for the primary effluent mixed with the secondary air. Particulates are accumulated at the fins and plates and are subsequently combusted when the stove reaches sufficient operating temperature.

Preferably, the heat recovery member has an elongated body having a first end disposed in a fluid communication with the preheat chamber through a first air passage and with the combustion chamber through a second air passage. A second end of the elongated body of the heat recovery member is disposed in direct contact with the surrounding atmosphere.

The elongated body of the heat recovery member is configured with co-axially extending internal and external pipes. The internal pipe serves to convey the air exiting from the combustion chamber to the surroundings, while the external pipe is adapted to convey the air incoming from the surrounding atmosphere into the preheat chamber. Heat exchange between the incoming air and the exiting air is carried out via a wall common to the internal and external pipes.

A fuel load grate for supporting fuel is disposed in proximity to the primary manifolds in the lower portion of the combustion chamber, wherein a primary effluent is produced as the result of the primary combustion phase.

A catalyst unit is disposed in proximity and upstream of the air passage between the combustion chamber and the internal pipe of the heat recovery member to react with the unburned particulates, thus further reducing the emissions level.

The system of sensors includes temperature sensors and chemical sensors, installed in the combustion chamber, upstream the catalyst unit, and in the internal pipe.

Preferably, an internal wall is disposed between the combustion chamber and the preheat chamber. The internal wall is configured with a dilution air opening located upstream and in proximity to the catalyst unit. A catalyst protection sub-system is established in the oven system which is coupled to the controller. The catalyst protection sub-system includes a valve installed in the dilution air opening and controlled by the controller to regulate a dilution air flow from the preheat chamber in accordance with the temperature sensors' readings on the catalyst unit temperature.

At least one thermoelectric generator (TEG) may be installed inside the stove, for example, in the preheat chamber in contact with the combustion chamber at one side of the TEG and in fluid communication with the surrounding atmosphere at another side of the TEG. Alternatively, the TEG may be positioned at the side wall(s), on the top, or at the bottom of the stove unit with one side of the TEG exposed to the heat produced by the stove, while another side of the TEG is maintained at lower temperatures. The TEG operates to generate electricity when a temperature gradient between the sides thereof is created. The generated electricity may be used in the stove to power its various components, as well as to supply power to external electronic devices.

The processor unit of the controller system is configured with a Combustion Fan Speed Control unit, adapted to increase the speed of the combustion fan at a start-up mode of the stove system operation, and regulate air flow throughout operation.

If the time since the beginning of the stove's operation exceeds a predetermined value:
  the controller turns the combustion fan OFF, when the temperature in the combustion chamber is lower than a predetermined lower threshold, or increases the speed of the combustion fan if the temperature in the combustion chamber ranges between the predetermined lower threshold and a predetermined higher threshold.

Additionally, the controller adjusts the speed of the combustion fan to correspond to a predetermined mode of the stove system operation if the temperature in the combustion chamber exceeds the predetermined high threshold.

A user interface is operatively coupled to the controller system. The user interface has user control buttons for a user to input commands and preferred settings to the controller. The user interface also is adapted to display messages issued by the controller.

Another aspect of the present invention embraces a method for operating a stove system, which is carried out via the steps of:

defining a combustion chamber and a preheat chamber in an internal compartment of the stove, where the combustion and preheat chambers are separated each from the other by an internal wall formed with at least one opening for fluid communication between combustion and preheat chambers; and attaching a heat recovery member to the oven, where the heat recovery member is configured with a co-axially extending internal pipe and an external pipe. The internal pipe extends in a fluid contact with the combustion chamber, while the external pipe is installed in fluid contact with the preheat chamber. Fluid communication is established between a surrounding atmosphere and the internal compartment through the heat recovery member.

The subject method is further enhanced by installing a combustion fan in proximity to a passage between the preheat chamber and the external pipe of the heat recovery member, as well as by installing a system of sensors in the combustion chamber and the internal pipe of the heat recovery system.

The combustion fan is configured to affect a forced supply of the outside air into the preheat chamber through the external pipe and a forced exhaust of the heated air from the combustion chamber to the surrounding atmosphere through the internal pipe of the heat recovery member.

A controller system configured with a processor unit is further operatively coupled to the system of sensors to acquire reading from the sensors, such as, for example, temperature and oxygen level in the stove.

The operation of the stove is further enhanced by processing the readings acquired from the sensors and transmitting a control signal generated responsive to the sensors' readings to the combustion fan, thereby affecting a forced air circulation through the stove system, which facilitates in efficient burning of the fuel in the combustion chamber.

The subject method continues through loading a fuel in the combustion chamber at its lower portion,
  igniting the fuel burning,
  actuating, through a user interface, a control process,
  inputting, through the user interface, a user preferred speed rate,
  responsive to the control process actuation, acquiring the sensors' readings, and
  performing, by the controller system, the following steps:
  issuing the control signal to increase the speed of the combustion fan if a time since the control process actuation is below a predetermined value; or, alternatively,
  if the time since the control process actuation exceeds the predetermined value, turning the combusting fan OFF if a temperature in the combustion chamber is below a predetermined low threshold temperature; or increasing the speed of the combustion fan, if the temperature in the combustion chamber ranges between the predetermined low threshold temperature, and a predetermined high threshold temperature; or if the temperature in the combustion chamber exceeds the predetermined high threshold temperature, regulating by the controller system, the speed of the combustion fan in correspondence to the user preferred speed rate.

The subject method is further carried out through the steps of:

establishing a catalyst protection loop including: a valve installed at the opening formed in the internal wall between the combustion and preheat chambers upstream and in close proximity to the catalyst unit, and a temperature sensor positioned in proximity to the catalyst unit;

processing the catalyst temperature readings acquired from a temperature sensor, and issuing a dilution air control signal to control the valve to regulate dilution air supply from the preheat chamber to the catalyst unit in the combustion chamber responsive to the catalyst temperature readings.

If the catalyst temperature reading is lower than a predetermined maximum allowable catalyst temperature, the valve is closed responsive to the dilution air control signal, and if the catalyst temperature reading exceeds the predetermined maximum allowable catalyst temperature, the valve is opened responsive to the dilution air control signal, thereby permitting the dilution air into the combustion chamber to cool down the catalyst unit.

The operation of the stove greatly benefits from a system of air distributing manifolds installed in the combustion chamber. The manifolds system includes primary manifolds extending in the lower portion of the combustion chamber in a fluid communication with the preheat chamber, and secondary manifolds extending in the upper portion of the combustion chamber upstream of the catalyst unit and in a fluid communication with the preheat chamber. A particulates trap sub-system is installed in proximity to the secondary manifolds.

After the fuel burning ignition and the actuation of the control process, the combustion fan is actuated to forcibly distribute primary air through the primary manifolds in the lower portion of the combustion chamber to sustain a primary fuel combustion phase, resulting in production of a primary effluent.

The primary effluent travels to the p articulates trap, and mixes with a secondary air injected in the upper portion of the combustion chamber from the preheat chamber through the secondary manifolds to sustain a secondary fuel combustion phase, thus further burning the fuel which remained unburned by the primary combustion, thus producing a particulate trap effluent.

The particulate trap effluent travels further through the catalyst unit for reacting partially unburned products of the secondary combustion phase remaining in the particulate trap effluent, thus producing an exhaust effluent substantially free of combustion products. The clean exhaust effluent exits from the stove through the external pipe of the heat recovery member.

These and other objects and advantages of the present system and method will be apparent from reading the following Detailed Description of the Invention in conjunction with the Patent Drawing Figures.

BRIEF DESCRIPTION OF THE DRAWINGS

FIG. 4B is the cross-section of the subject stove shown in FIG. 1 taken along lines B-B with the air flow circulating through the oven;

DETAILED DESCRIPTION OF THE PREFERRED EMBODIMENTS

Figure 1:
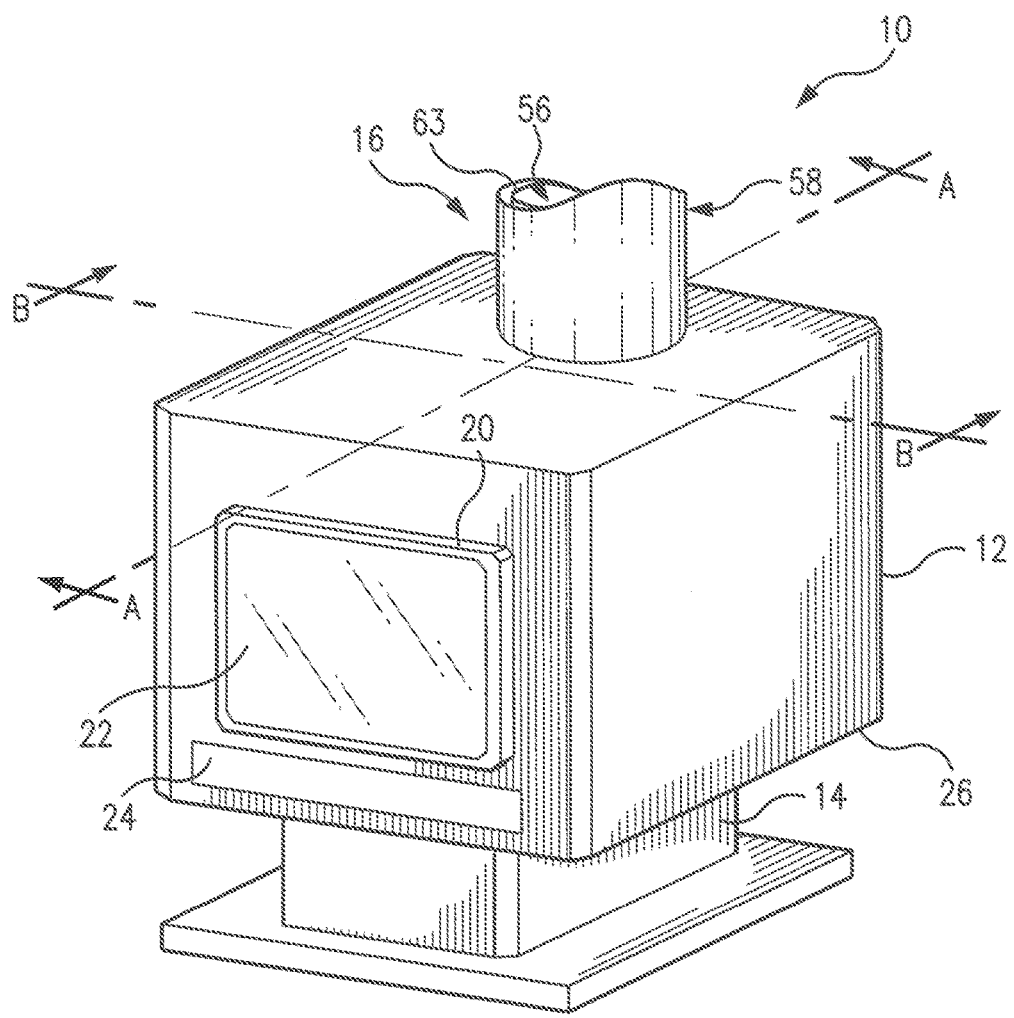
FIG. 1 is a perspective front view of the solid fuel burning stove of the present invention.

Referring to FIGS. 1-2, 3A-3B, 4A-4B, and 5-6, the subject stove system 10 includes a main body 12 supported by a stand 14 and ventilated to the exterior through a co-axial stack heat recovery member 16. The stove system 10 may be used for burning solid fuels, such as, for example, coal, wood pellets, corn, etc. However, for the purpose of example, but not for limiting the scope of protection of the present invention, further description will be related to the subject stove as a wood burning stove.

Although shown as of a somewhat rectangular configuration, the main body 12 of the subject stove 10 may have any other shape appropriate for the function intended. The main body 12 may be fabricated from steel or any other sufficiently strong and heat resistant material.

The stand 14 which is a supporting member for the main body 12 may be formed in any shape other than that shown, as an example, in FIGS. 1-6, as long as it provides the functions intended and is ergonomically and aesthetically viable.

The main body 12 is configured with an opening 18 covered by a door 20. As an example, the door 20 may be configured as a hinged door with a glass or ceramic viewing window 22.

A removable ash pan 24 is provided near a bottom 26 of the main body 12. The main body 12 is designed with an internal compartment 23 substantially isolated from the exterior to prevent major air flow into or out of the main body's compartment when the door 20 is closed except through the co-axial stack heat recovery member 16.

Figure 2:
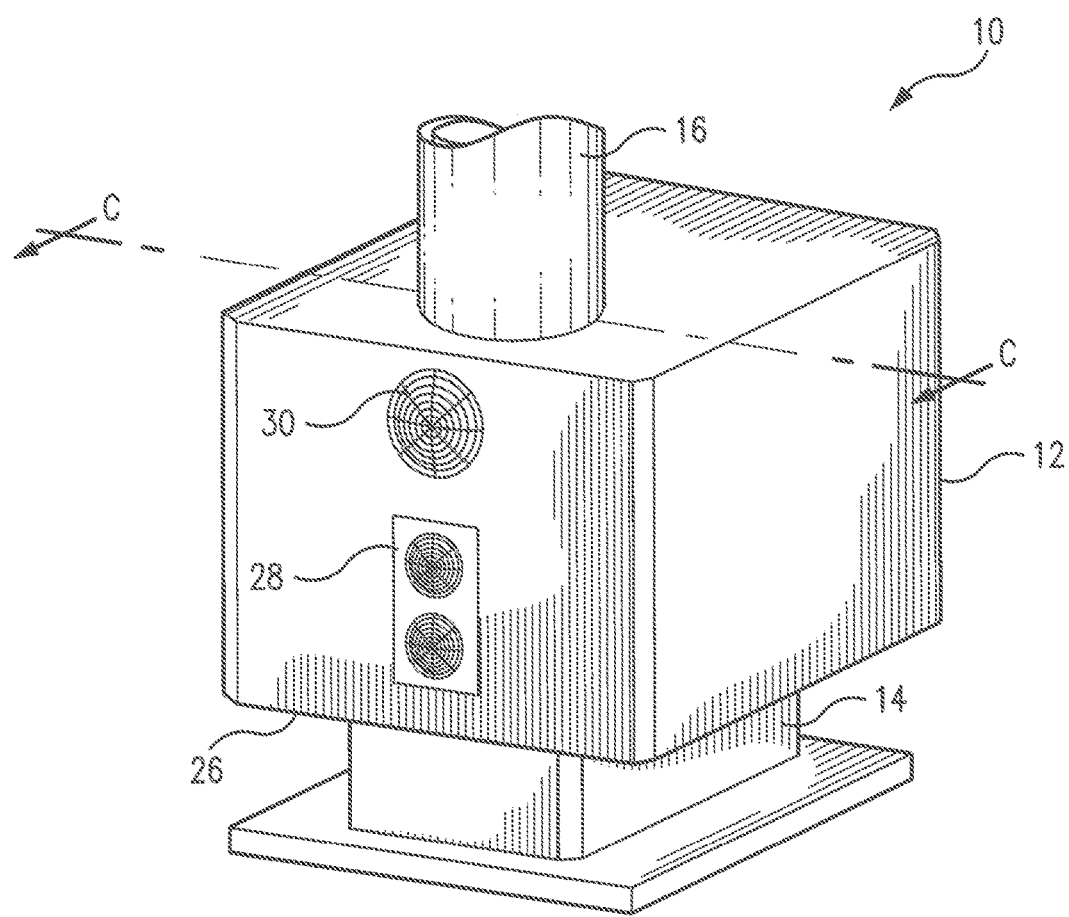
FIG. 2 is a perspective view of the solid fuel burning stove of the present invention.

Shown in FIG. 2, is the rear view of the stove system 10 with the main body 12, the stand 14, and the co-axial stack 16 visible. Also visible in FIG. 2 are room circulation fans 28 and ventilation passage 30 for a combustion fan 32 (best presented in FIGS. 3A-3B, 5 and 9).

The operation of the stove system 10 will be detailed in further paragraphs in conjunction with cross-sectional views and cut-out view of the stove presented in FIGS. 3A-3B, 4A-4B, 5 and 6, each of which displays the interior mechanics of the subject stove system.

Figure 3A:
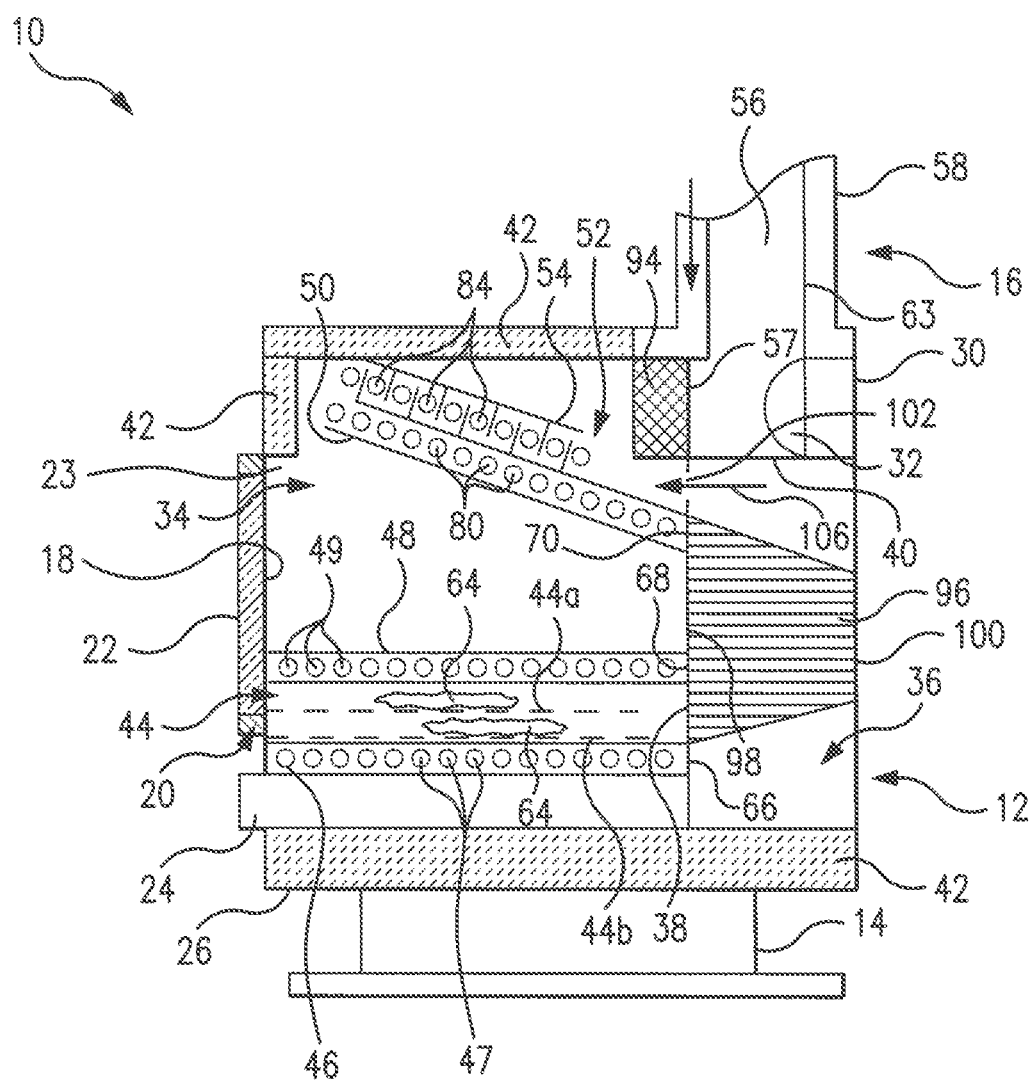
FIG. 3A shows a cross-section of the stove shown in FIG. 1 taken along lines A-A.
Figure 3C:
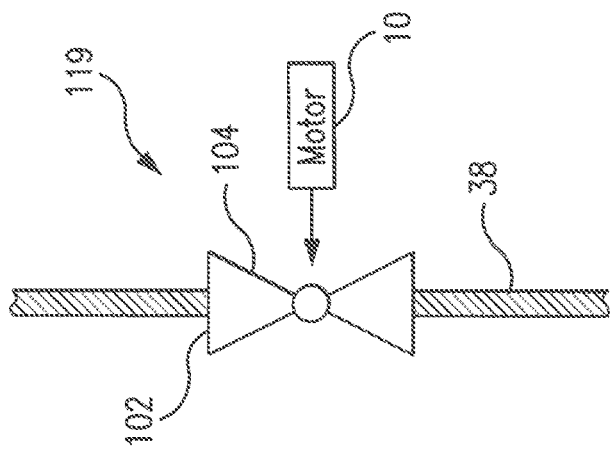
FIG. 3C is a schematic representation of the Catalyst Protection Loop.
Figure 3B:
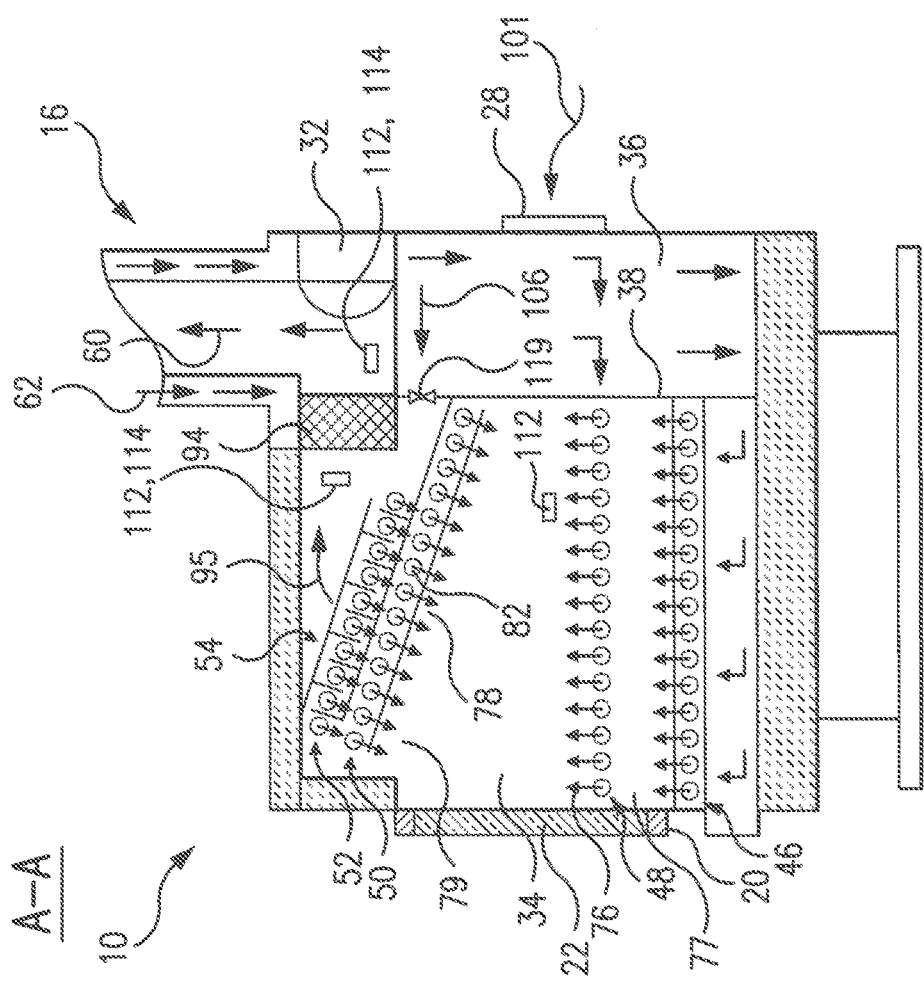
FIG. 3B is a cross-section of the stove shown in FIG. 1 taken along lines A-A with the air flows circulating through the oven.
Figure 4A:
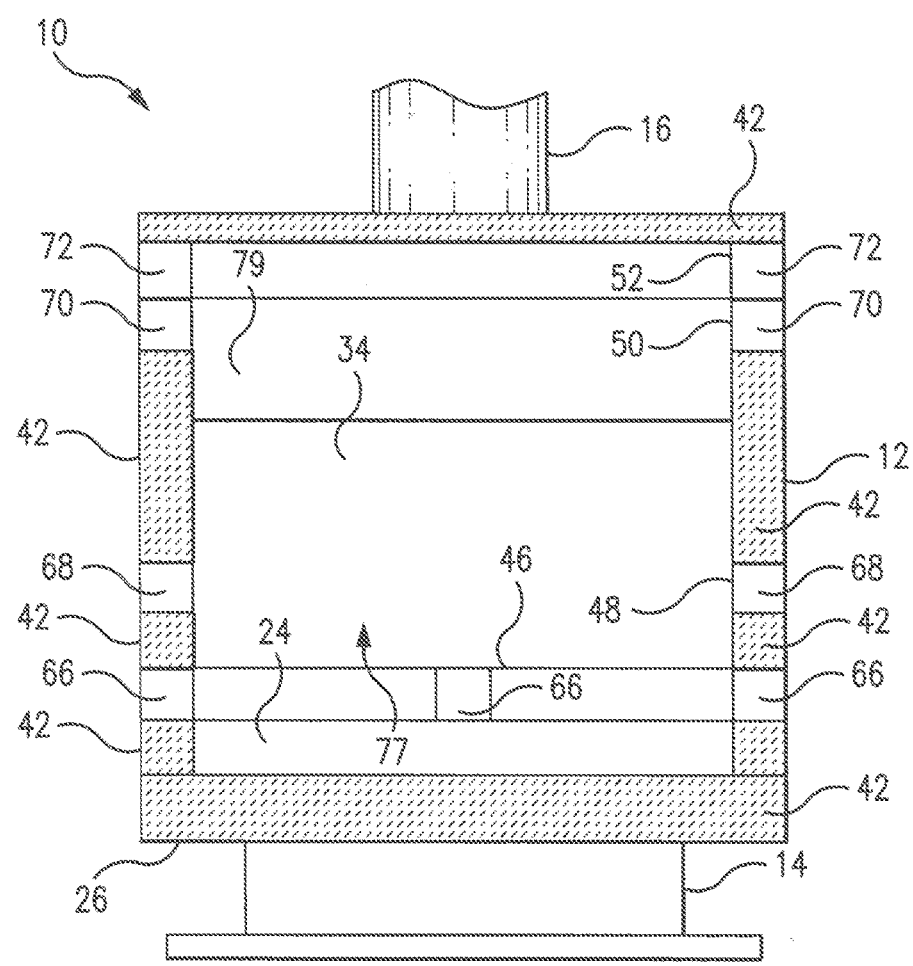
FIG. 4A is a cross-section of the stove shown in FIG. 1 taken along lines B-B.
Figure 5:
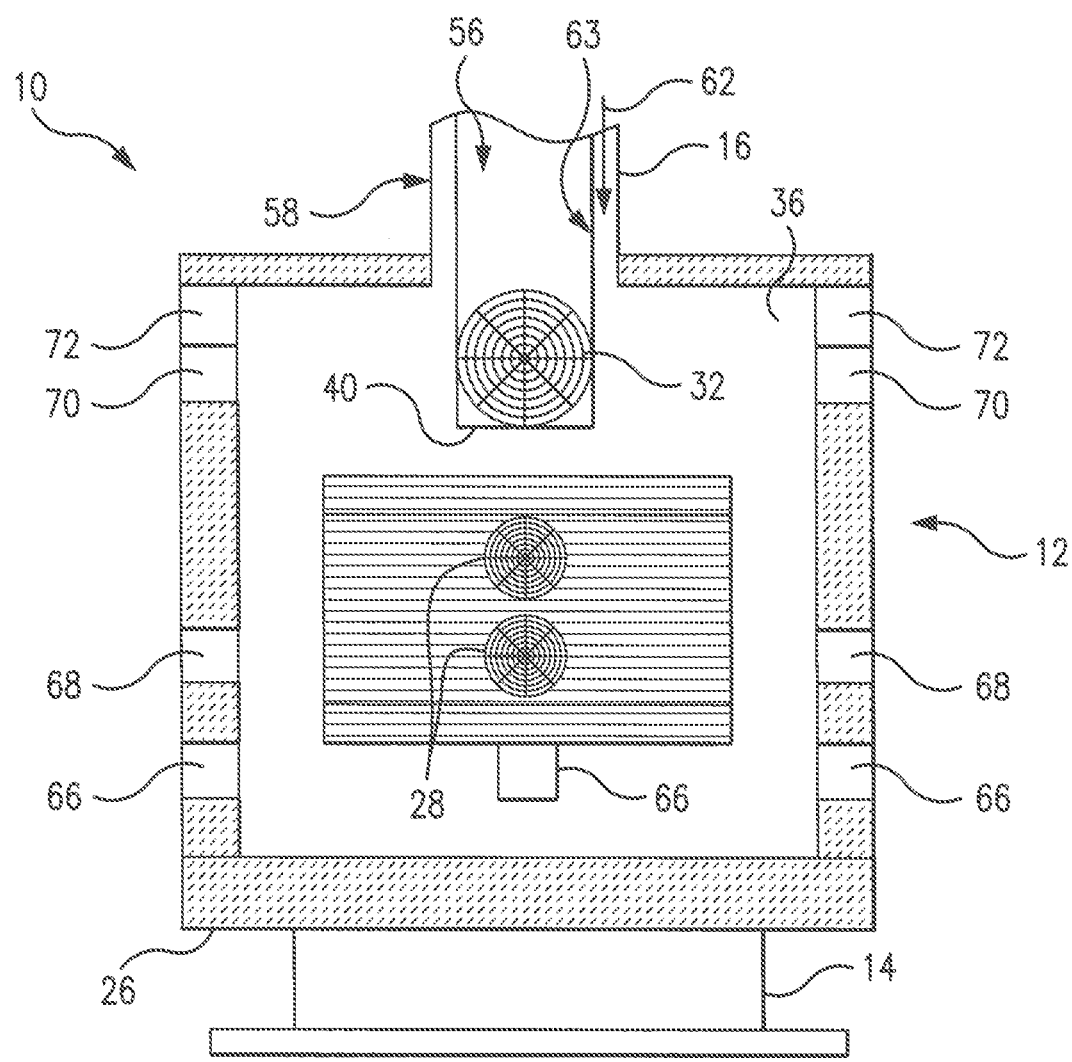
FIG. 5 is a cross-section of the solid fuel burning stove shown in FIG. 2 taken along lines C-C.

Referring to FIGS. 3A-3B, the compartment 23 of the main body 12 includes a primary combustion chamber 34 and a preheat chamber 36 separated from the primary combustion chamber 34 by an internal wall 38 allowing fluid communication and heat exchange between the chambers 34 and 36. The co-axial stack heat recovery member 16, at the bottom 40 thereof extends in fluid communication with the preheat chamber 36.

The primary combustion chamber 34 is insulated by panels 42 made of a compressed ceramic fiber, or other suitable material that is heat resistant and has insulating properties. The panels 42 are placed in specific locations of the primary combustion chamber 34, as shown in FIGS. 3A-3B, 4A-4B, and 5, in order to ensure an elevated combustion temperature within the combustion chamber 34 and safe temperatures at the exterior of the stove. Heat is further dispersed by the room circulation fan assembly 28 that blows the air heated by the stove through surroundings.

A grate 44 is provided in the primary combustion chamber 34 below a lip of the door 20 and above the ash pan 24 which slides in and out of the stove for removal of the unburned fuel and ash.

Figure 6:
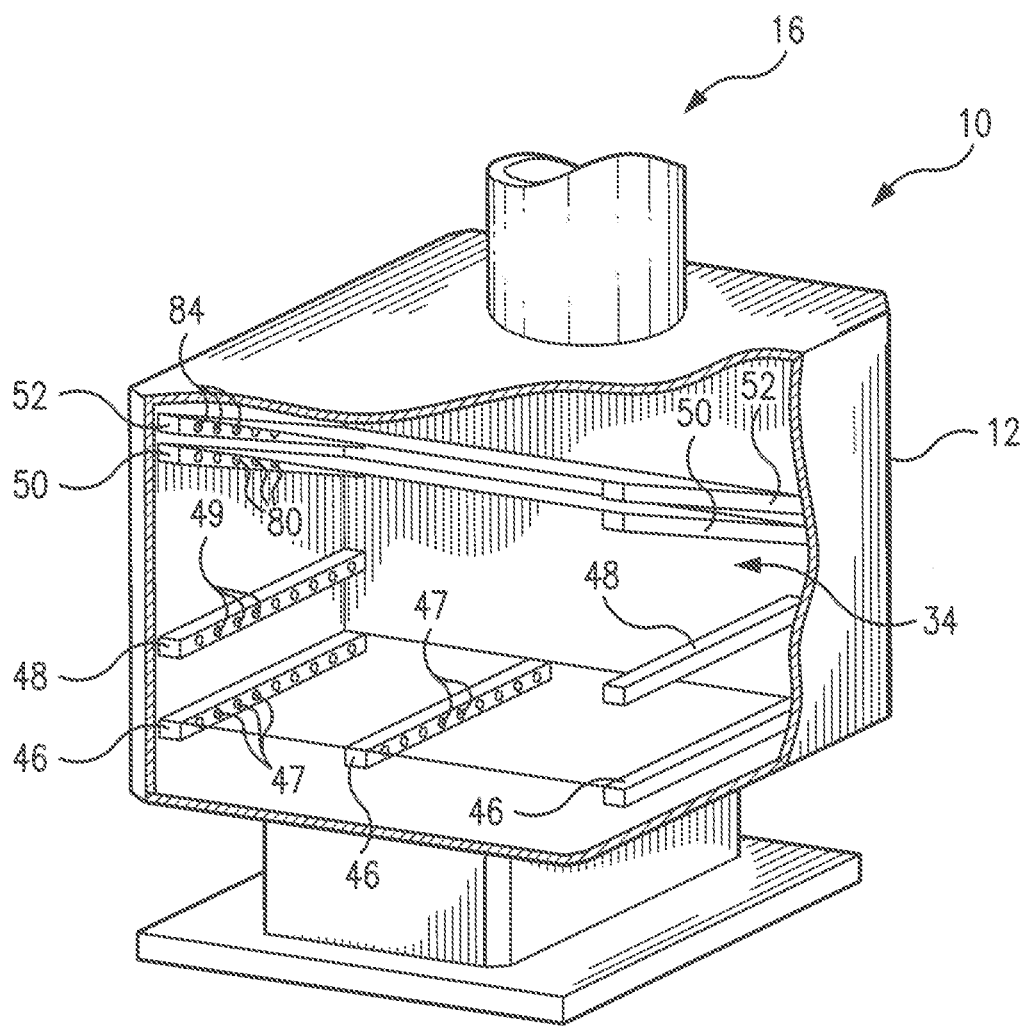
FIG. 6 is a cut-out view of the stove shown in FIG. 1 illustrating the air injection manifolds in the subject stove system.

Shown in FIGS. 3A-3B and 6, is a manifold air injection sub-system composed of a lower primary manifold 46 (located beneath the grate 44 and above an ash pan 24) and an upper primary manifold 48 (located above the grate 44). The manifold air injection sub-system also includes a lower secondary manifold 50 and an upper secondary manifold 52 which extend at the top of the primary combustion chamber 34 in a somewhat angled (including perpendicular) relationship to the walls of the chamber 34.

Between the lower and upper secondary manifolds 50 and 52, respectively, extends a particulate collector 54 which will be detailed further herein.

A catalytic combustor 94 is installed above the secondary lower and upper manifolds 50 and 52 and the particulate collector 54 at the passage 57 between the primary combustion chamber 34 and the air exhaust passage of the co-axial stack heat recovery member 16.

As shown in FIGS. 3A-3B, 4B, 5, and 7, the co-axial stack heat recovery member 16 includes two co-axial pipes, i.e., an internal pipe 56 and an external pipe 58 extending co-axially and in surrounding relationship with the internal pipe 56. The internal pipe 56 is intended for the passage of the effluent 60, i.e., the outgoing gas or exhaust. The external pipe 58 is intended for bringing combustion air 62 from the room into the preheat chamber 36.

A solid fuel, such as, for example, cord wood, or another suitable fuel 64, further referred to herein intermittently as fuel (or wood), is inserted into the primary combustion chamber 34 through the opening 18 in the front wall of the main body 12 which is closed off by the door 20. The wood 64 rests on the grate 44. The grate 44 may be implemented in any structural configuration as long as it serves the function intended. The grate 44 may be implemented as a single layer (as shown in FIG. 3B), or as a multi-layer structure (as shown in FIG. 3A), or in any other configuration. As an example only, but not to limit the scope of the present stove system to this particular implementation, in one of the alternative embodiments of the subject stove design, the grate 44 may be configured as a double-tier structure, i.e., with two grates 44a and 44b for dual layer fuel load. The dual layer grate 44 may allow for wood to be positioned in a tiered fashion.

As shown in FIG. 3A, the fuel load 64 is positioned between the lower primary manifold 46 and the upper primary manifold 48, and thus the air injected directly beneath the grates 44 from the lower primary manifold 46 and above the wood from the upper primary manifold 48, encourages an equal burning of the fuel 64 on its entire surface.

If the double layer grate is used, the separation of levels of wood fuel which is positioned on two grates 44a and 44b may further assist in even burning while allowing flame feedback from both levels of the wood to speed and ease the initial ignition.

Figure 7:
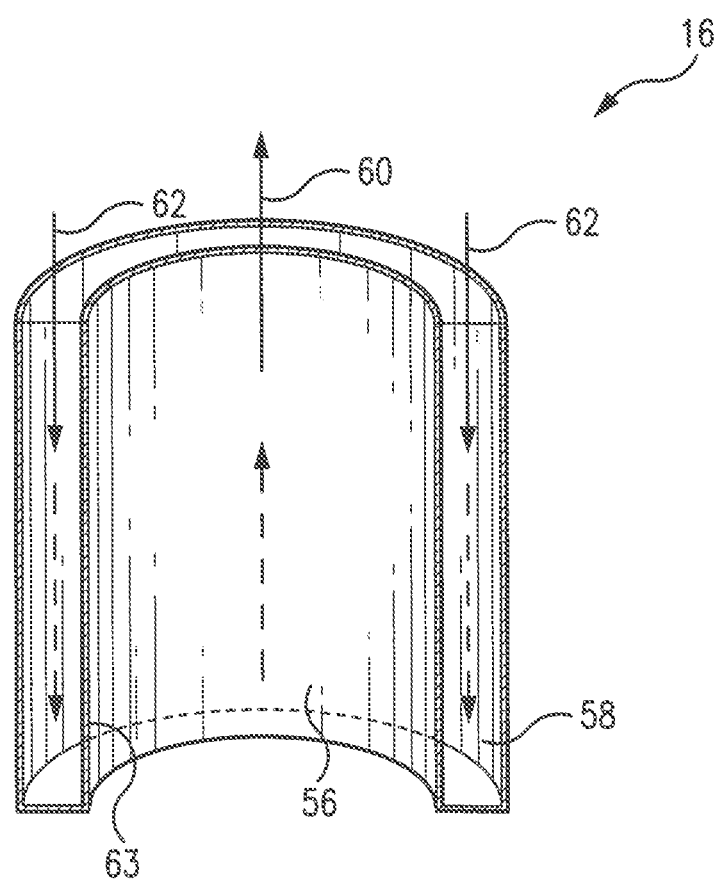
FIG. 7 is a longitudinal cross-section of the co-axial stack heat recovery sub-system used in the subject stove system.

As shown in FIGS. 3B, 4B, and 7, the co-axial stack heat recovery member 16 is used to bring the primary combustion air 62 into the preheated chamber 36 and to exhaust the effluent 60 through the exhaust internal pipe 56. The effluent 60, i.e., the product of the fuel combustion in the primary combustion chamber 34, is driven up the interior pipe 56 of the co-axial stack heat recovery member 16 by the combustion fan 32 which is positioned in proximity to the bottom 40 of the co-axial stack heat recovery member 16. This airflow creates a negative pressure through the co-axial stack heat recovery member 16 which, in addition to the forced air intake facilitated by the combustion fan 32, draws the combustion air 62 down the external pipe 58 and into the preheat chamber 36. This action serves to lower the temperature of the hot effluent 60.

The forced air circulation supported by the combustion fan 32 used in the present wood stove 10 permits the incoming air 62 to be "pushed" in through the long external pipe 58 rather than necessitating its draw immediately from within the room. The cold inlet air (combustion air 62) is blown down around the pipe 56 which carries the hot exhaust gases (effluent 60).

During travel through the pipes 56 and 58, the hot exhaust gases 60 and the room temperature inlet air 62 are exposed to heat exchange through the wall 63 common to the pipes 58 and 56, which, due to a sufficient length of the co-axial stack heat recovery member 16, has a substantial heat exchanging surface. Thus, the hot exhaust gases 60 are cooled while the cool inlet air 62 is warmed during travel through their respective pipes. This ensures that more heat (which would otherwise be lost to exhaust) is returned back into the burning process, thus improving efficiency as well as reducing particulate emissions by an expedited raising of the temperature in the internal compartment 23 (also referred to herein intermittently as a fire box).

As shown in FIGS. 3B and 4A-4B, and 5-6, the primary combustion air 62 enters from the preheat chamber 36 into the lower primary manifolds 46, upper primary manifolds 48, as well as lower and upper secondary manifolds 50 and 52 respectively, through their respective passages (i.e., passage 66 for lower primary manifold 46, passage 68 for the upper primary manifold 48, passage 70 for the lower secondary manifold 50, and passage 72 for the upper secondary manifold 52). As the air exits from the preheat chamber 36 into the combustion chamber 34, the preheat chamber, in its turn, is filled with combustion air 62 flowing through the exterior pipe 58 of the co-axial stack 16. The flow of the combustion air 62 is regulated by the combustion fan 32 which forcibly circulates the air in response to a command issued by a smart controller 74, the function and operation of which will be described further herein.

Being exposed to the primary combustion air 62 which is injected into the low portion 77 of the combustion chamber 34 through the lower primary manifold 46 located beneath the grate 44 and above the ash pan 24, and through the upper primary manifold 48, the fuel 64 undergoes a primary combustion phase in a fuel rich state. Primary combustion takes place near the solid wood fuel. Upon exposure to elevated temperatures, originating with the ignition of the flame by a user manually or automatically via actuating an ignition system (not shown in the drawings) installed in the stove and controlled by the user, the fuel's temperature rises, and combustible wood gas is released.

Primary air is the air 62 which is supplied into the combustion chamber 36 through the openings 47 and 49 of the oven primary manifolds 46, 48, respectively, to react in the primary combustion phase of the process. As shown in FIGS. 3B, 4B, and 8B, an effluent of the primary combustion phase (also referred to herein as primary effluent) 76 which is the result of the primary combustion, moves upwards from the lower portion 77 (also referred to herein as a lower fire chamber) of the primary combustion chamber 34 to the upper portion 79 (also referred to herein as an upper fire chamber) of the combustion chamber 34 where it is mixed with a secondary air 78 flowing in the upper fire chamber 79 through the openings 80 of the lower secondary manifold 50.

In the upper fire chamber 79, the primary effluent 76 begins to undergo secondary combustion, further burning off the unburned fuel and producing a secondary effluent 76' as it moves towards and into the particulate collector 54, where it mixes with more secondary air 82 injected into the upper fire chamber 79 through the openings 84 of the upper secondary manifold 52.

The secondary combustion phase takes place remote from the wood fuel, and occurs after introduction of additional oxygen, supplied with the secondary air 78.

The manifolds 46, 48, 50, and 52 are shaped as hollow tubes of varying shape with a series of holes along one or multiple sides used for the distribution of the air coming into the manifold from the preheat chamber 36. Manifolds 46, 48, 50 and 52 are positioned in such a manner to evenly distribute air throughout the primary combustion chamber 34. There are three lower primary manifolds 46 and two each of the manifolds 48, 52 and 50.

The forced air combined with the manifolds' mechanics permits control of air introduction and circulation.

The preheat chamber 36 undergoes a heat exchange process with the primary combustion chamber 34 (where temperatures may reach 600° C. and above), through the wall 38, and thus heats to approximately 200° C. The air 62 entering the preheat chamber 36 thus heats in the preheat chamber and enters the manifolds at an elevated temperature, further contributing to the burning process.

The system of manifolds 46, 48, 50, 52 distributes air throughout the stove providing a turbulent well mixed environment in which optimal burning can be achieved. Secondary upper manifolds 50, 52 provide additional oxygen for a "reburn" process (or secondary combustion process) by which partially combusted fuel and products of the primary combustion can be completely burned to extract maximum heat and minimize emissions.

Specifically, as shown in FIG. 8B, after leaving the lower fire chamber 77, the partially burned fuel 76' (which is a product of combustion of the primary effluent 76 in the atmosphere of the added secondary air 78) enters the particulate trap 54 installed in the upper fire chamber 79.

Figure 8A:
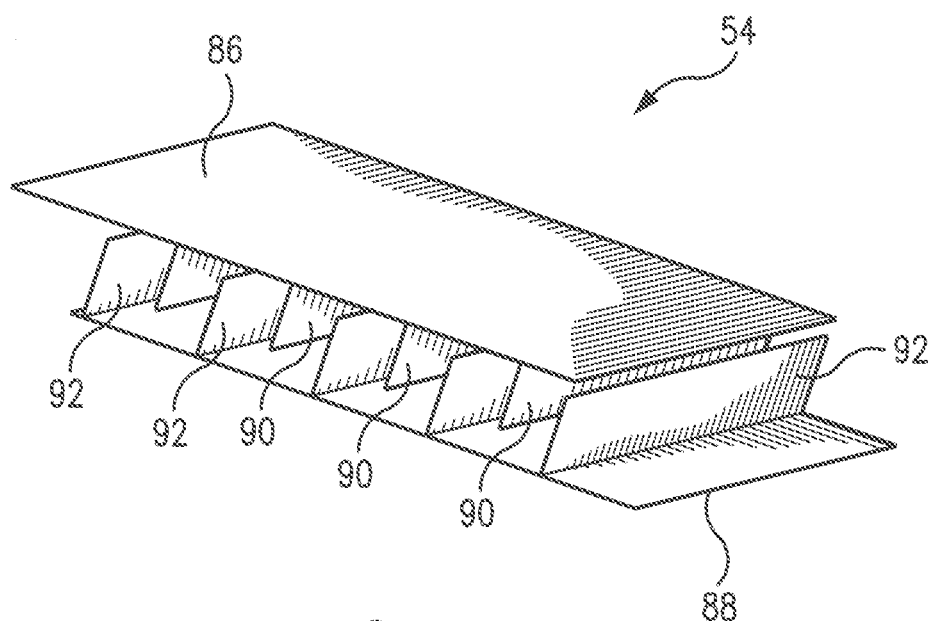
FIGS. 8A and 8B show specifics of the design of the particulate trap sub-system used in the subject stove system.
Figure 8B:
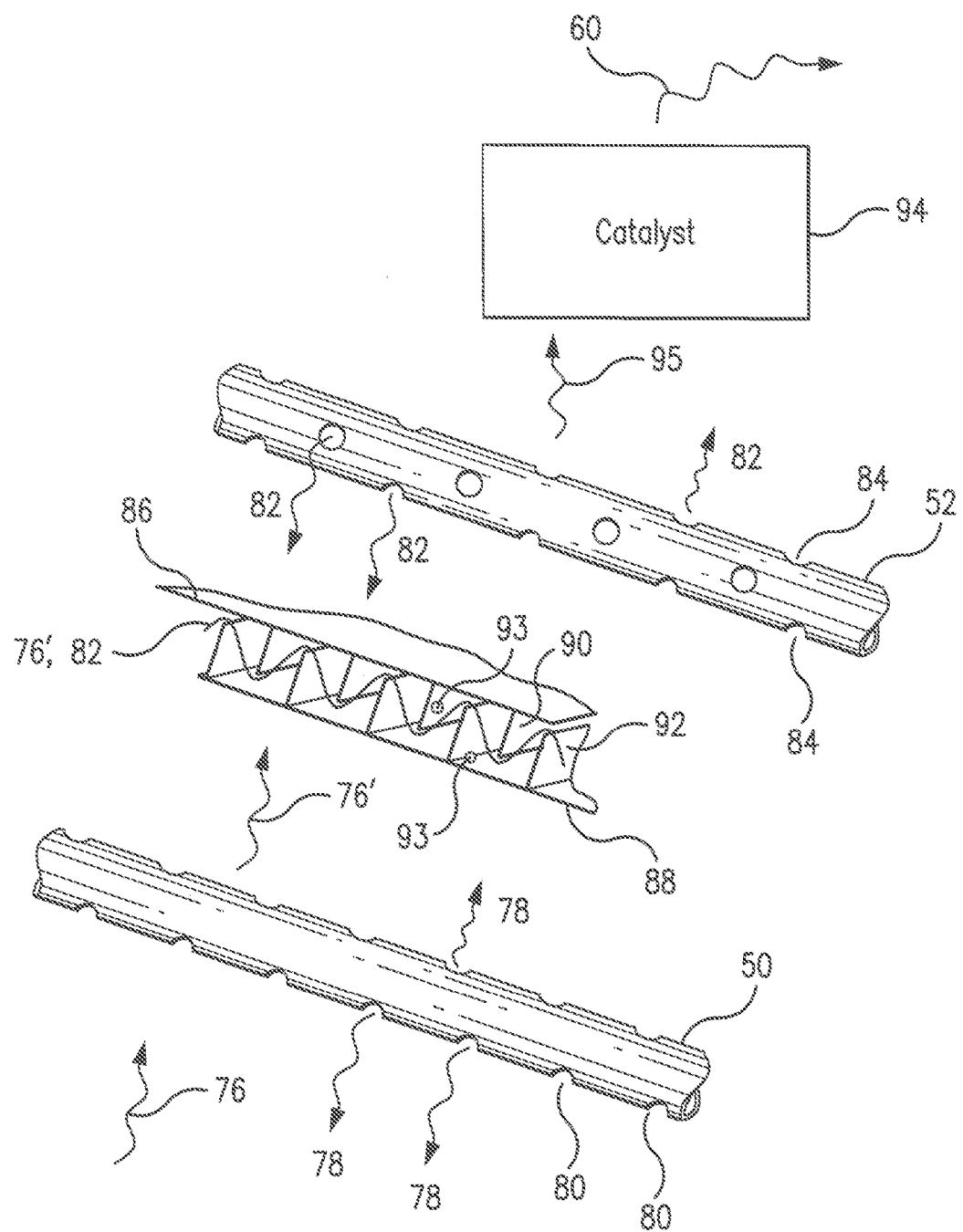

Referring to FIGS. 8A-8B, the particulates trap 54 (also referred to herein as a particulates collector) includes an upper plate 86, a lower plate 88, and an array of fins 90 and 92, extending from the upper and lower plates 86 and 88, respectively, in an angled relation thereto and facing each other.

The provisions of the fins 90, 92 in the particulates collector 54 (as well as the specifics of the particular trap's geometry, i.e., distance between the upper and lower plates 86, 88, dimensions of the fins 90, 92, lateral distance between the fins, as well as the angles between the fins 90, 92 and the plates 86, 88) have been chosen to facilitate an extended path for the flow of the effluent 76' and the secondary air 82 injected through the openings 84 of the upper secondary combustion manifold 52.

The particulates collector 54 is constructed from sheets of steel or other sufficiently strong and heat resistant materials. The arrays of fins 90 and 92 extending from the upper and lower plates 86 and 88, respectively, form channels which force the air 76' flowing out of the stove 10 to undergo a series of rapid changes of direction. While the air itself has no trouble moving through these bends, the soot particles 93 suspended in the air flow 76' have an excessive linear momentum which prevents them from the abrupt turns. These soot particles 93, instead of moving with the air flow through the particulate trap 54, stick to the fins 90 and 92, which may extend perpendicular to their respective planes 86, 88.

During the early, i.e., "dirty" phase of the fuel burning fire, soot accumulates on the panels and fins of the particulates trap 54 rather than being emitted from the stove. When the fire reaches its "hot" stage, the fins 90, 92 heat to a temperature sufficiently high to burn off the soot, thus self-cleaning the fins 90, 92 and plates 86, 88 and simultaneously reducing particulates emission.

The effluent 95 emitted from the particulate collector 54, travels further to pass through the catalytic combustor 94 positioned in the passage 57 between the primary combustion chamber 34, particularly, the its upper fire chamber 79, and the exhaust, i.e., the internal pipe 56 of the co-axial stack heat recovery member 16.

The catalyst in the subject wood stove serves the purpose of further reducing emissions from the wood stove. Due to the forced air circulation in the subject system, the effluent 95 has enough "driving force" to pass through the thin channels inside the catalyst (catalyst combustor), and thus does not have to be diverted around the catalyst during any of burning phases of the combustion process.

The catalytic combustor 94 for the subject wood stove may be configured as a cylinder or a rectangular prism constructed of ceramic or metal, with a honeycomb style interior, coated in platinum, palladium, or other suitable materials. The structure and functionality of the catalyst (catalyst combustor) 94 is known to those skilled in the art, and therefore, will not be detailed further herein. Partially burned products of combustion contained in the effluent 95 are further reacted at the catalytic combustor 94. The effluent 60 produced as the result of chemical reaction of the effluent 95 in the catalytic combustor 94 is thus cleaner than the effluent 95.

The clean effluent 60 enters into the exhaust pipe 56 prior to reaching the combustion fan 32, and subsequently is driven by the combustion fan 32 through the interior 56 of the co-axial stack heat recovery member 16 where it is then exhausted to the exterior of the wood stove 10 in a manner typical of wood stoves.

Figure 9:
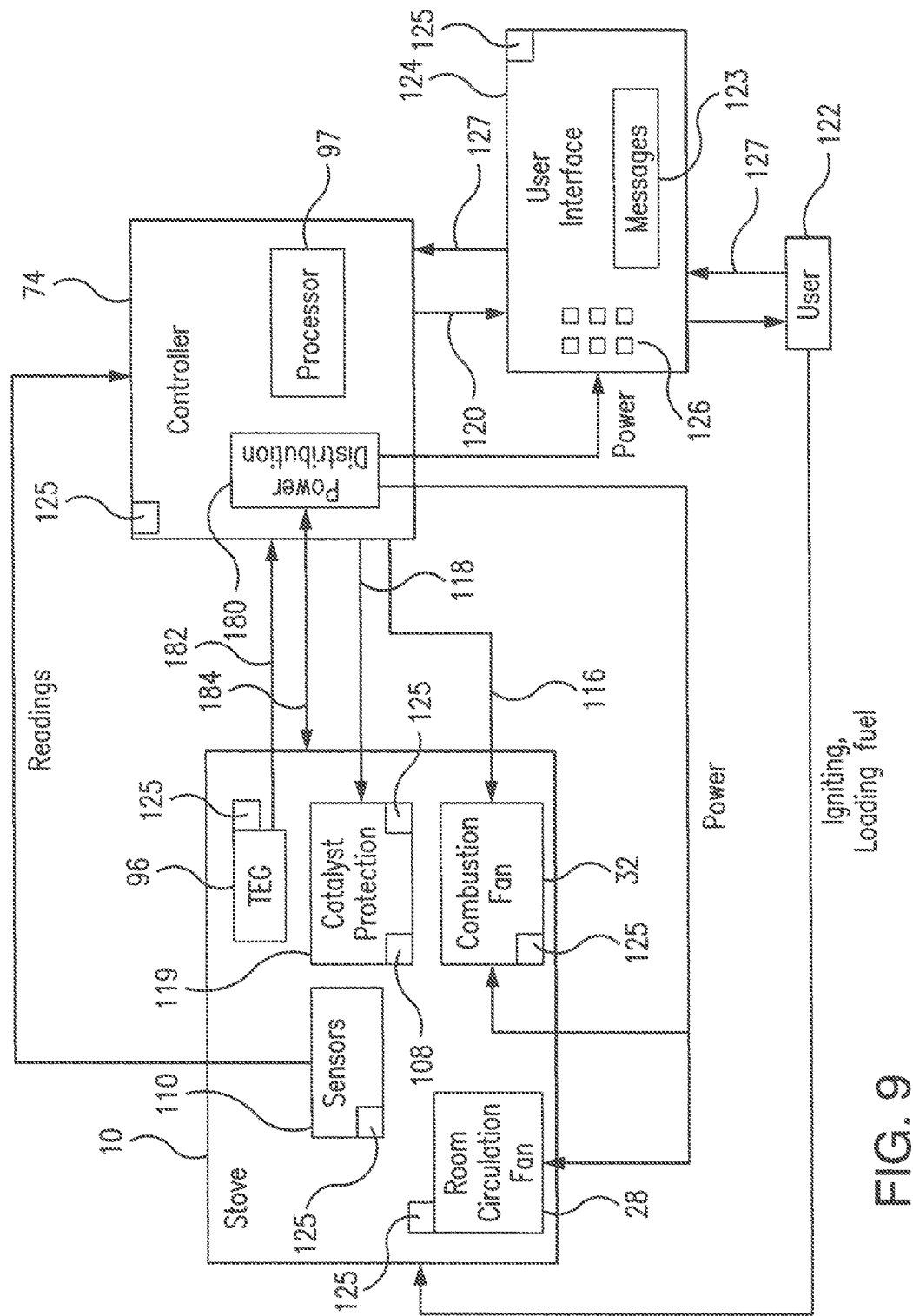
FIG. 9 is a block diagram representing a control scheme underlying the operation of the subject stove system.

Referring again to FIG. 3A and further to FIG. 9, a room circulation fan assembly 28 may optionally be paired with one (or several) thermoelectric generator(s) 96.

Thermoelectric generators, also referred to herein as TEGs, generate electricity when a heat gradient is established therethrough. The TEG(s) may be positioned inside the stove, for example, in the preheat chamber 36. Alternatively, the TEG(s) may be installed at the side wall(s), and/or on the top, as well as at the bottom of the main body 12 of the stove, i.e., at any location where a coupling of the TEG with the stove produced heat may be established.

If, for example, positioned inside the preheat chamber 36, with a side 98 of the TEG 96 in contact with the hot wall 38 of the primary combustion chamber 38, and a surface 100 at a colder (room) temperature provided by the flow of air 101 facilitated by the room circulation fan assembly 28 (as shown in FIG. 3A), the thermoelectric generator 96 generates electricity which may be used to power components of the oven, as schematically presented in FIG. 9, as well as external electronic devices (for example, cellular phones, radio, etc.).

The power generated by the TEG 96 may be controllably supplied to the combustion fan 32, the room circulation fans 28, as well as to the user interface, controller units, and other sufficiently small electronic devices, included in and supporting the operation of the subject stove system, thus allowing the stove to operate "off-grid", i.e., in a substantially self-sufficient manner, without sacrificing increase in performance of the subject stove which is supported by the forced air circulation through the system (which requires an additional power supply to the combustion fan 32, as well as room circulation fans 28).

Referring to FIGS. 3B and 3C, a catalyst protection loop 119 may be formed in the stove 10, which is configured with a dilution air bypass 102 (also shown in FIG. 3A) formed in the wall 38 between the primary combustion chamber 34 and the preheat chamber 36. The dilution air bypass 102 may be implemented with a valve 104 which can be controlled to affect an additional airflow 106 entrance into the primary combustion chamber 34 immediately upstream the catalyst 94 to prevent the catalyst from overheating.

When the valve 104 is open, the dilution air 106 flows from the preheat chamber 36 into the primary combustion chamber 34, specifically, into the space above the particulate collector 54 but immediately prior to the catalyst 94. The valve 104 may be operated by a small actuator or a motor 108 controlled by the Smart Controller 74 responsive to the readings of the sensors installed in the stove to allow or prevent air flow 106 through the bypass 102.

The flame is ignited in the primary combustion chamber 34 either externally by the user, or there may be a built in igniter (not shown in the drawings), as the combustion air 62 is flowing in forced by the combustion fan 32.

Referring to FIG. 9, which is a diagram of a control scheme underlying the operation of the wood stove 10, a system 110 of sensors is incorporated in the stove for acquiring temperature and chemical readings through the system. The system of sensors 110 may include temperature sensors 112 which may be positioned throughout the oven's internal compartment 23 where the temperature readings are desired to be acquired, for example, within the primary combustion chamber 34, directly prior to the catalyst system 94, as well as in the exhaust 62. The sensors system 110 also includes chemical, i.e., oxygen sensor(s) 114, which may be placed in the exhaust 62, as well as prior to the catalyst 94. The temperature sensors 112 and the oxygen sensors 114 operate to acquire temperature and oxygen readings in the stove. Any type of electronic temperature and oxygen sensors (i.e., chemical, parametric, etc.) capable of operating at elevated temperatures is contemplated in the subject stove system.

Figure 10:
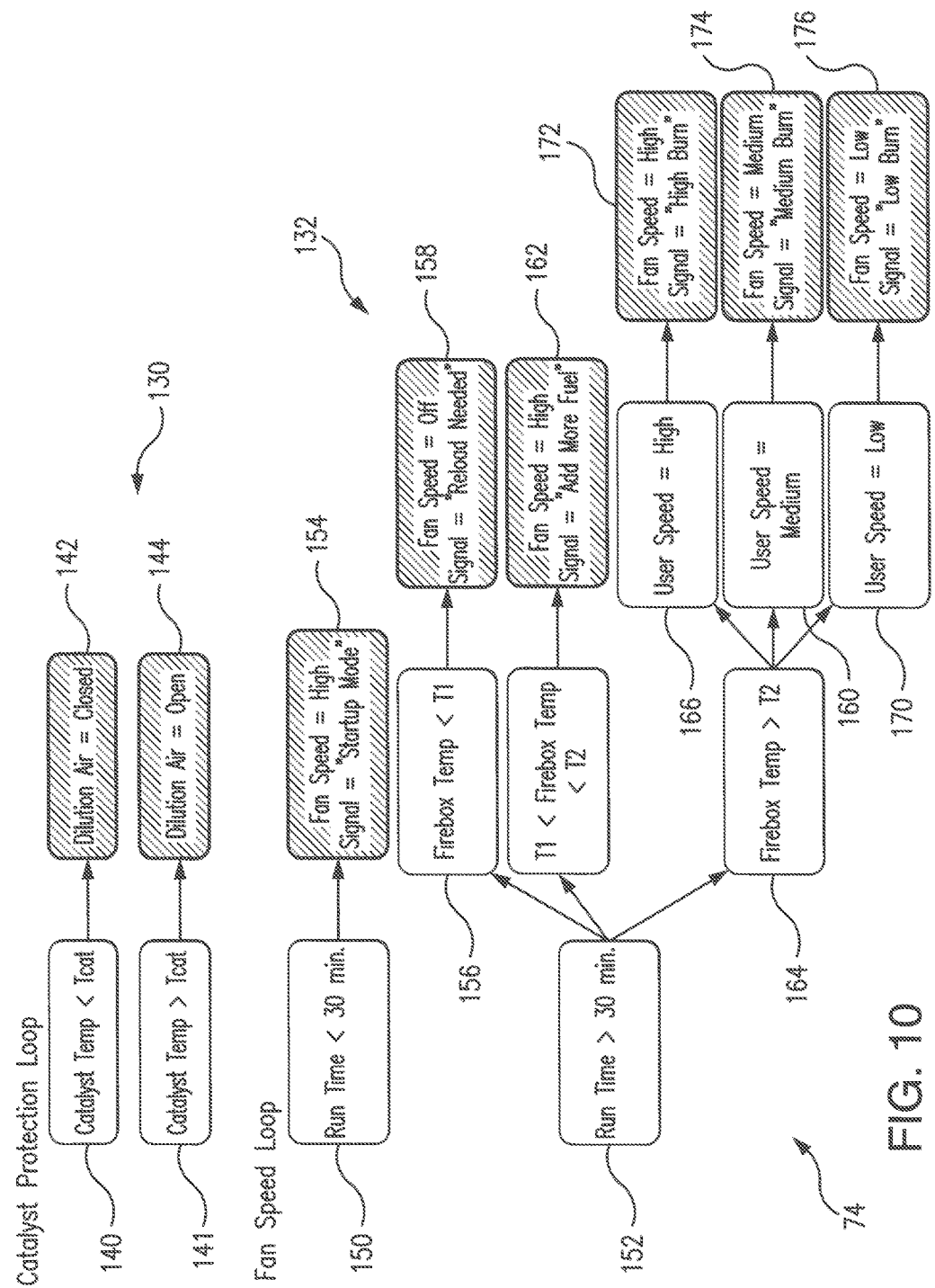
FIG. 10 is a diagram representing the logic underlying the operation of the subject stove system.

The readings of the sensors (temperature and/or oxygen) are provided to the Smart Controller 74 for processing in accordance with the logic scheme presented in FIG. 10 and described in detail further herein. The Smart Controller 74 is configured with a processor unit 97 for processing of the temperature and oxygen readings acquired from the sensor system 110 and, responsive to these readings, for generating control signals. A control signal 116 is supplied to the combustion fan 32 for regulation of the fan's speed to control the forced airflow through the stove system in order to maximize efficiency and minimize emissions.

Also, responsive to the sensor's readings, the Smart Controller may generate a control signal 118 supplied to the Catalyst Protection Loop 119, and particularly to the actuator (or motor) 108 for opening/closing the valve 104 in order to control the dilution air passage into the primary combustion chamber 34, when needed to prevent the catalyst overheating.

In addition to the dynamical control of the combustion fan 32 and the catalyst protection loop 119, the controller 74 may also generate user feedback commands and messages 123 which are transmitted to the user interface 124 and displayed through either a mobile application or a fixed display (screen).

These prompts may serve the purpose of informing the user 122 of conditions within the stove. For example, the feedback messages 123 may indicate that the stove has run out of the fuel, and more fuel is needed for the burning process. Responsive to this message, the user, at his/her discretion, may follow up with adding more fuel into the combustion chamber 34.

The user interface 124 may also display the information generated by the Smart Controller 74 about the running state of the stove, and direct measurements of temperature and oxygen, as well as calculated performance parameters such as, for example, the burning efficiency, emissions, heat release rate, etc.

In addition, the user interface 124 may receive and display some suggestions from the Smart Controller 74 to the user 122 which are determined by the Smart Controller through monitoring data from the stove. For example, if the temperature in the combustion chamber 34 is low and the oxygen level is high, the user is prompted to load more fuel. If the Smart Controller determines that the temperature is low and the oxygen level is low, even with a high airflow rate, the message 123 is sent with suggestions that the stove needs to be cleaned.

The speed of the combustion fan 32 is not changed by the user feedback, but the variables which control the speed of the fan 32 may be transmitted to the user interface purely for user's information.

The controller 74 also may offer feedback messages to the user suggesting better methods or better fuels for burning, as well as energy efficiency, or safety tips, including the suggestions to the user that require no answer such as "Burn Hard Dry Wood", "Keep the Door of the Stove Shut", "Don't Burn Trash", among others. Having the stove itself reminding the user to use it properly in generally beneficial to improve its performance.

The user interface 124 is provided with control buttons 120 which may include ON/OFF buttons, a Reset button, Burn Speed Control, Emergency Shutdown button, and others, for the user to feedback the user's commands 127, as well as to set up a desired mode of operation, such as, for example, preferred burn rate.

The controller 74 in the system may be built into the stove 10 with a display/controls positioned at the face of the wood stove. Alternatively, the controller may be a wall mounted display/control connected to the sensors through wires or adapted for wireless communications. In addition, the controller 74 may be a built in the oven system with display/controls residing in a remote device or a mobile application.

All signals transmissions in the subject oven system 100, including communications between sensors and the controller, or between the controller 74 and the combustion fan 32, room circulation fans 28, catalyst protection loop 119, and the user interface 124 may be carried out either by wires or wirelessly. For the wireless communication, the sensors, the controller, the combustion fan, the room circulation fan, the actuator in the catalyst protection loop, as well as the user interface may be provided with transceivers 125 for receiving/transmitting signals therebetween.

As shown in FIG. 9, the Smart Controller 74 is also configured to regulate the distribution of the energy produced by the TEG 96. It is envisioned that the Smart Controller 74 may dynamically monitor the power requirements of each electronic module in the oven system 10 and the available power generated by the TEG 96, and dynamically re-distribute the power supply in the oven system in an optimal fashion.

Referring again to FIGS. 9 and 10, the Smart Controller 74 is operatively coupled to the sensors system 110 (temperature sensors 112 and oxygen sensors 114) to dynamically monitor the internal stove conditions. The Smart Controller 74 is also operatively coupled to the combustion fan 32 to adjust the speed of the fan 32 as soon as monitored variables acquired from the sensors are changed in order to maintain the optimal burning conditions for the situation at hand.

The controller 74 also is configured to obtain the user's regime settings (user's preferred burn rates) and to adjust the speed of the combustion fan 32 to achieve the user's required burning regimes, i.e., "Slow Overnight Burning", or "Rapid Home Heating".

As shown in FIG. 10, the logic underlying the functionality of the Smart Controller 74 includes the Catalyst Protection Logic Loop 130 and the Fan Speed Logic Loop 132.

In the Catalyst Protection Logic Loop 130, when in the logic block 140 it is determined that the reading of the temperature sensor positioned before the catalyst are lower than Tcat (which is a threshold temperature above which there is a risk the catalyst can be damaged), the logic flows to block 142 "Dilution Air=Close", at which time the controller sends a signal to the actuator (or motor) to close the valve, thus stopping the passage of the dilution air from the preheat chamber to the primary combustion chamber. If however, in logic block 141 it is determined that the catalyst temperature is above the Tcat, the logic flows to block 144 "Dilution Air=Open". At this time, the signal instructs the actuator to open the valve, thus permitting passage of dilution air from the preheat chamber into the primary combustion chamber in the space directly upstream and in proximity to the catalyst to reduce the temperature in the vicinity of the catalyst.

In the Fan Speed Logic Loop 132, if in the logic block 150 the Run Time (i.e. the time since the start button (ON button) on the user interface is actuated) is below a predetermined value, for example, 30 minutes, the logic flows to block 154 "Fan Speed=OFF signal=Reload Needed", in which the controller 74 initiates the operation of the system in the start-up mode by increasing the speed of fan, and transmits the message "Reload Needed" to the user interface.

If however in the logic block 152, it is determined that the Run time is over 30 minutes, the logic flows to the logic block 156 where the determination is made (based on the readings of the temperature sensor in the primary combustion chamber), whether the temperature in the combustion chamber is below T1 (T1 is a temperature below which the oven system assures that there is no fire burning in the primary combustion chamber.) If the temperature in the primary combustion chamber is below T1, the logic flows to block 158, where the controller 74 issues a command to turn the combustion fan OFF, and the signal passes to the user interface 124, prompting a reload of fuel by displaying the message "Reload Needed" at the user interface.

If, however, in logic block 160 it is determined that the Fire Box temperature ranges from T1 to T2 (where T2 is a temperature below which there is a fire in the firebox, but this temperature has not crossed the threshold needed for the clean burning), the logic flows to block 162, at which instance the controller issues a command to set the combustion fan speed at a high speed and sends the signal "Add More Fuel" to the user interface to display thereat.

If, however, in logic block 164, it is determined that the firebox temperature is above T2, the logic cooperates with blocks 166, 168 or 170 to acquire therefrom the settings of the desired burning regime input by the user through the user interface 124. In accordance with the settings in blocks 166, 168, 170, the controller issues a corresponding command to the combustion fan in blocks 172, 174, 176 respectively. For example, if in block 166 the burning conditions in the stove correspond to the user preferred "High Speed" the logic flows to block 172 and the Smart Controller 74 increases the speed of the Combustion Fan. Simultaneously, the Smart Controller sends the informational message "High Burn" signal to the User Interface.

If, however, in block 168, the user's preferred burn rate setting indicates that the fan speed is medium, the logic flows to block 174, and sets the speed of the combustion fan at the medium level. Simultaneously, the Smart Controller outputs an information message "Medium Burn" to the User Interface.

If in block 170, the user's preferred burn rate setting is indicated at "Low", the logic flows to block 176, where the controller sets the fan speed at a low level, and the message "Low Burn" is displayed on the User Interface.

Although, it is shown in the fan speed logic loop 132, that the controller operates based on the input readings of temperature sensors, it is contemplated also that the readings on the state of the burning process in the subject oven system may be made based on reading from the oxygen sensor, or alternatively, based on a combination of temperature and oxygen sensors. No matter what sensor(s) provide(s) the reading into the controller, all inputs are monitored continuously by the Smart Controller and adjustments to the combustion fan speed and the catalyst protection loop are affected dynamically as soon as variables change.

As an example, temperature distribution in the stove may be as follows: 200° C. in the preheat chamber, approximately 600° C. in the primary combustion chamber 34, approximately 300° C. in the vicinity of the catalyst, and about 150° C. in the exhaust.

The TEG may generate an additional 40 W of power which can be used for powering of the stove electronics as shown in FIG. 9, as well as external devices. The controller is provided with a power distribution sub-system 180 which is configured to process the power level 182 available for the TEG, and power requirements 184 of the electronic units in the subject stove system 10, and to dynamically distribute/redistribute the power generated by the TEG 96 between them. Alternatively, it is envisioned that, instead of the TEG, an external power source may be used to power the combustion fan, and other electronics in the system.

The testing of the subject wood stove prototype has demonstrated excellent performance characteristics. Using a WOHLER SM500 flow gas sampling unit, the particulate emissions level was measured below 0.05 g/hour, which is substantially better than 4.3 g/hour for a catalytic stove, which is the current EPA emission standard accepted in the industry. Carbon monoxide concentrations were measured at 9 ppm. The efficiency of the subject wood stove is above 93%. The burning rate of 15 kW has been attained during experiments.

The subject oven system is exceedingly efficient due to a complete combustion of the fuel in a multi-phase combustion process facilitated by the air injection/distribution system embedded in the stove, and through the use of a well-controlled forced air supply for both primary combustion phase and the secondary combustion phase provided by the combustion fan 32 dynamically regulated by the Smart Controller 74 based on the burning conditions in the stove. In addition, the combustion fan facilitates the integration of the co-axial stack heat recovery member 16 which removes heat that is otherwise exhausted and returns (recycles) the heat back into the system, thus further contributing to the highly efficient operation of the stove.

The present invention produces fewer emissions due to the well-controlled air supply for substantially complete burning of the fuel, and effective particulates trap integrated in the system, which further promotes cleanness of the exhaust.

In addition to the high efficiency and low emissions level, the present invention is ergonomical, cost effective, and user friendly, and may find its particular usage in household having no access to natural gas or other utilities.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:
1. A high-efficiency low-emission stove, comprising:
  a main body configured with an internal compartment defined within said main body,
  a combustion chamber defined in said internal compartment and adapted for multi-phase combustion of a fuel loaded therein,
  a heat recovery member attached to said main body and configured to establish a fluid communication channel between said combustion chamber and the external environment,
  a combustion fan unit installed in operative coupling to said heat recovery member, said combustion fan unit being configured to provide forced air circulation through said internal compartment, a system of sensors installed in said internal compartment, and a controller system operatively coupled to said system of sensors and said combustion fan unit, said controller system being configured with a processor configured for processing readings acquired from said system of sensors, and for generating control signals for transmission to said combustion fan unit to affect the operation thereof in correspondence to said readings, thereby controlling the burning process in said combustion chamber, wherein said internal compartment further includes a preheat chamber defined therein in fluid communication with said combustion chambers and said heat recovery member, and an air distribution system installed in said combustion chamber in fluid communication with said preheat chamber, said air distribution system being configured for creating a predetermined pattern of distribution of the air forcibly injected in said combustion chamber from said preheat chamber, and wherein said multi-phase combustion of the fuel includes a primary combustion phase and a secondary combustion phase, said air distribution system including a plurality of manifolds disposed in said combustion chamber, and configured with primary manifolds extending in a lower portion of said combustion chamber to facilitate said primary combustion phase, and secondary manifolds extending in an upper portion of said combustion chamber to facilitate said secondary combustion phase.

2. The high-efficiency low-emission stove of claim 1, wherein said heat recovery member has an elongated body having a first end disposed in a fluid communication with said preheat chamber through a first air passage, and in a fluid communication with said combustion chamber through a second air passage, and a second end disposed in a direct contact with said surrounding atmosphere, wherein said elongated body of said heat recovery member is configured with co-axially extending internal and external pipes, said internal pipe being adapted to convey the air exiting from said combustion chamber to said surrounding atmosphere, and said external pipe being adapted to convey the air incoming from said surrounding atmosphere into said preheat chamber, and wherein a heat exchange between said incoming air and said exiting air is carried out via a pipe wall common to said internal and external pipes, respectively.

3. The high-efficiency low-emission stove of claim 2, further comprising a fuel load grate supporting a fuel load and disposed in proximity to said primary manifolds in said lower portion of said combustion chamber, wherein a primary effluent is produced as the result of said primary combustion phase of said fuel burning supported by a primary air flow forcefully injected into said lower portion of said combustion chamber through said primary manifolds in said lower portion of said combustion chamber.

4. The high-efficiency low-emission stove of claim 3, further comprising a filter disposed in said combustion chamber down-stream said primary manifolds, wherein said filter includes a particulates trap unit disposed in said combustion chamber in proximity to said secondary manifolds in said upper portion of said combustion chamber, wherein said primary effluent from said lower portion received at said particulates trap unit mixes with a secondary air flow forcefully injected into said upper portion of said combustion chamber through said secondary manifolds and undergoes said secondary combustion phase, thereby substantially fully burning the fuel.

5. The high-efficiency low-emission stove of claim 4, wherein said particulates trap unit includes at least a pair of plates disposed in a spaced relationships each to the other, and an array of fins disposed at each of said plates in an angled relationship thereto, and intermittently positioned in facing relationship one to another, thereby creating an extended flow pass for said primary effluent mixed with the secondary air, and wherein particulates accumulated at said fins and plates, are combusted as the result of said secondary combustion phase, thereby self-cleaning said particulates trap unit.

6. The high-efficiency low-emission stove of claim 5, wherein said fuel load grate includes at least one grate, or at least two grates stacked one over another to provide multi-tier fuel load.

7. The high-efficiency low-emission stove of claim 5, further comprising a catalyst unit disposed in said combustion chamber downstream said particulates trap unit and upstream said second air passage defined between said combustion chamber and said internal pipe of said heat recovery member.

8. The high-efficiency low-emission stove of claim 7, wherein said system of sensors includes sensors selected from a group consisting of temperature sensors and chemical sensors, installed in said combustion chamber, upstream said catalyst unit, and in said internal pipe of said heat recovery member.

9. The high-efficiency low-emission stove of claim 8, further including an internal wall disposed between said combustion chamber and said preheat chamber, said internal wall being configured with a dilution air opening upstream and in proximity to said catalyst unit, and a catalyst protection subsystem, coupled to said controller, said catalyst protection sub-system including a valve installed in said dilution air opening and controlled by said controller system to regulate a dilution air flow from said preheat chamber in accordance with said temperature sensors' readings on said catalyst unit temperature.

10. The high-efficiency low-emission stove of claim 1, further comprising at least one thermoelectric generator (TEG) installed in a heat contact with said stove at one side of said at least one TEG and in a fluid communication with said surrounding atmosphere at another side of said at least one TEG, wherein said at least one TEG is configured to generate electricity when a temperature gradient between said one and another sides thereof is created, and wherein said generated electricity is coupled to said stove system.

11. The high-efficiency low-emission stove of claim 1, further comprising a user interface operatively coupled to said controller system, said user interface including user's control buttons for a user to input commands and preferred settings to said processor unit, and a display for displaying messages sent from said controller system to said user interface.

12. A high-efficiency low-emission stove, comprising:
a main body configured with an internal compartment defined within said main body,
a combustion chamber defined in said internal compartment and adapted for multi-phase combustion of a fuel loaded therein, a heat recovery member attached to said main body and configured to establish a fluid communication channel between said combustion chamber and the external environment, a combustion fan unit installed in operative coupling to said heat recovery member, said combustion fan unit being configured to provide forced air circulation through said internal compartment, a system of sensors installed in said internal compartment, and a controller system operatively coupled to said system of sensors and said combustion fan unit, said controller system being configured with a processor configured for processing readings acquired from said system of sensors, and for generating control signals for transmission to said combustion fan unit to affect the operation thereof in correspondence to said readings, thereby controlling the burning process in said combustion chamber, wherein said processor unit of said controller system is configured with a combustion fan speed unit, wherein said combustion fan speed unit is configured to increase the speed of said combustion fan at a start-up mode of the stove system operation if time since the beginning of controller actuation is below a predetermined value.

13. The high-efficiency low emission stove of claim 12, wherein said combustion fan speed unit is further configured:

if the time since the beginning of controller actuation exceeds the predetermined value, to turn said combustion fan OFF, when the temperature in said combustion chamber is lower than a predetermined lower threshold, to increase the speed of said combustion fan, if the temperature in said combustion chamber ranges between said predetermined lower threshold and a predetermined higher threshold, and to adjust the speed of said combustion fan to a predetermined mode of the stove system operation, if the temperature in said combustion chamber exceeds said predetermined high threshold.

14. A method for operating a stove system, comprising:

(a) configuring a stove with a main body and defining an internal compartment within said main body;

(b) forming a combustion chamber and a preheat chamber in said internal compartment, extending an internal wall between said combustion and preheat chambers, wherein said wall being formed with at least one opening for fluid communication between said combustion and preheat chambers;

(c) configuring a heat recovery member with co-axially extending internal pipe and external pipe, operatively coupling an internal end of said internal pipe with said combustion chamber, and an internal end of said external pipe with said preheat chamber, and establishing a fluid communication between a surrounding atmosphere and said internal compartment through said heat recovery member, installing a catalyst unit in a passage between said combustion chamber and said internal pipe of said heat recovery member, establishing a catalyst protection loop including a valve installed at said at least one opening formed in said internal wall between said combustion and preheat chambers upstream and in close proximity to said catalyst unit, and a temperature sensor positioned in proximity to said catalyst unit;

(d) installing a combustion fan in proximity to a passage between said preheat chamber and said external pipe of said heat recovery member;

(e) installing a system of sensors in said combustion chamber and said heat recovery system;

(f) operatively coupling a controller system configured with a processor unit to said system of sensors to acquire reading from at least one of said sensors;

(g) processing, by said processor unit, said readings acquired from said at least one sensor, processing the catalyst temperature readings acquired from said temperature sensor, and issuing a control signal responsive to said readings; and (h) transmitting said control signal to said combustion fan, thereby affecting a forced air circulation through the oven system, thus facilitating substantially complete burning of a fuel in said combustion chamber, wherein said control signal includes a dilution air control signal to control said valve to regulate dilution air supply from said preheat chamber to said catalyst unit in said combustion chamber responsive to said catalyst temperature readings, wherein, if the catalyst temperature reading is lower than a predetermined maximum allowable catalyst temperature, said valve is closed, responsive to said dilution air control signal, and if the catalyst temperature reading exceeds said predetermined maximum allowable catalyst temperature, said valve is opened responsive to said dilution air control signal, thereby permitting the dilution air into said combustion chamber to cool down said catalyst unit.

15. The method of claim 14, further comprising:

operatively coupling a user interface to said controller system, after said step (f), loading the fuel in said combustion chamber at a lower portion thereof;

igniting said fuel burning;

actuating, through said user interface, said controller system;

inputting, through said user interface, a user preferred speed rate;

responsive to said controller system actuation, acquiring readings of said at least one sensor, and (i) issuing, by said controller system, said control signal to increase the speed of said combustion fan if time since said controller system actuation is below a predetermined value; and, if said time since the control process actuation exceeds said predetermined value, (j) turning said combusting fan OFF if a temperature in said combustion chamber is below a predetermined low threshold temperature; and (k) increasing the speed of said combustion fan, if the temperature in said combustion chamber ranges between said predetermined low threshold temperature, and a predetermined high threshold temperature; and (l) if the temperature in said combustion chamber exceeds said predetermined high threshold temperature, regulating, by said controller system, the speed of said combustion fan in correspondence to said user preferred speed rate.

16. The method of claim 14, further comprising:

prior to said step (g), installing in said combustion chamber a system of air distributing manifolds in a fluid communication with said preheat chamber, said air distributing manifolds including primary manifolds extending in said lower portion of said combustion chamber, and secondary manifolds extending in an upper portion of said combustion chamber upstream said catalyst unit, installing a particulates trap sub-system in proximity to said secondary manifolds, and after the ignition of the fuel burning and the actuation of said controller system, controlling said combustion fan to forcibly inject a primary air through said primary manifolds in said lower portion of said combustion chamber to sustain a primary combustion phase of said fuel, resulting in production of a primary effluent, subsequently, supplying said primary effluent to said particulates trap, mixing said primary effluent with a secondary air forcibly injected in the upper portion of said combustion chamber from said preheat chamber through said secondary manifolds to sustain a secondary combustion phase, thus further burning the fuel unburned by said primary combustion, and thus producing a particulate trap effluent, passing said particulate trap effluent through said catalyst unit for reacting partially burned products of said secondary combustion phase remaining in said particulate trap effluent, thus producing an exhaust effluent substantially free of combustion products, and exhausting said exhaust effluent through said internal pipe of said heat recovery member.

17. The method of claim 16, wherein said combustion fan is configured to affect a forced supply of outside air into said preheat chamber through said external pipe and to affect a forced exhaust of the heated exhaust effluent from said combustion chamber to said surrounding atmosphere through said internal pipe of said heat recovery member, and wherein in said step (h), said controller system transmits messages to the user for being displayed at said user interface.

* * * * *